United States Patent [19]

Frazier

[11] Patent Number: 5,118,364

[45] Date of Patent: Jun. 2, 1992

[54] SOLDER FLUX/PASTE COMPOSITIONS

[75] Inventor: Janice D. Frazier, San Jose, Calif.

[73] Assignee: International Business Machines Corporation, Armonk, N.Y.

[21] Appl. No.: 743,480

[22] Filed: Aug. 8, 1991

[51] Int. Cl.⁵ .............................................. B23K 35/34
[52] U.S. Cl. ...................................... 148/23; 148/24; 148/26
[58] Field of Search ...................................... 148/23–26

[56] References Cited

U.S. PATENT DOCUMENTS

| | | | |
|---|---|---|---|
| 2,664,371 | 12/1953 | Snell | 148/23 |
| 2,880,126 | 3/1959 | Jordan et al. | 148/23 |
| 3,030,241 | 4/1962 | Brightly | 148/23 |
| 3,575,738 | 4/1971 | Becker | 148/25 |
| 3,912,550 | 10/1975 | Bolte et al. | 148/23 |
| 4,092,182 | 5/1978 | Arbib et al. | 148/23 |
| 4,151,015 | 4/1979 | Cooper | 148/23 |
| 4,701,224 | 10/1987 | Zado | 148/23 |
| 4,895,606 | 1/1990 | Jafri | 148/25 |
| 4,940,498 | 7/1990 | Rubin | 148/23 |
| 5,045,127 | 9/1991 | Dershem | 148/24 |

*Primary Examiner*—Peter D. Rosenberg
*Attorney, Agent, or Firm*—Robert B. Martin

[57] ABSTRACT

The present invention relates to solder flux and solder paste compositions which do not require cleaning after the soldering operation.

14 Claims, No Drawings

SOLDER FLUX/PASTE COMPOSITIONS

FIELD OF THE INVENTION

The present invention relates to solder flux and solder paste compositions and in particular relates to solder flux and solder paste compositions which do not require cleaning after the soldering operation.

BACKGROUND OF THE INVENTION

Soldering of metals is well-known in art. It is a general practice to employ a fluxing agent during soldering to clean oxides and impurities from the surface of the metals and enable the formation of an effective solder joint.

Prior art solder fluxes generally yield flux residues which are corrosive and/or conductive. It has been a practice in the industry to wash these residues off the components after the soldering operation, especially for electronic components. The cleaning step normally involves the use of one or more halogenated organic solvents such as chlorofluorocarbons. However, there is a desire to eliminate the use of such solvents for ecological reasons.

Recently water cleanable solder fluxes and solder pastes have been introduced to the electronics industry. For example, Zado, U.S. Pat. No. 4,701,224, issued Oct. 20, 1987, discloses a solder flux which employs an ammonium halide salt as an activator. Although, the water-cleanable approach eliminates the use of organic solvents, it creates a waste water problem and the water cleaning step generally adds costs to the overall soldering process.

U.S. Pat. No. 4,940,498 issued Jul. 10, 1990 discloses a solder flux which employs a small amount of organic acid (e.g. 1-3% by weight) as an activator. The patent discloses that after the soldering operation, only negligible flux residues remain. However, it is known in the art that organic acids generally form tin and lead salts with soldering.

It is therefore an object of this invention to provide a solder flux and paste which does not require cleanup after the soldering operation.

Other objects and advantages will become apparent from the following disclosure.

SUMMARY OF THE INVENTION

The present invention relates to solder flux and solder paste compositions which do not require cleaning after the soldering operation during the production of electronic devices. The compositions of the present invention comprise an organic quaternary ammonium salt and an organic solvent. Both of the ingredients in the composition of the present invention decompose and/or volatilize during the soldering operation thereby obviating the need for any cleaning step.

Suitable organic quaternary ammonium salts for use in the composition of the present invention include salts having the formula:

$$[R_1R_2R_3R_4N]^+X^-$$

where $R_1$ to $R_4$ are each independently $C_1$-$C_{13}$ alkyl provided the total number of carbons atoms in $R_1$ to $R_4$ does not exceed 16 and $X^-$ is selected from oxide, hydroxide, alkoxide, aryloxide, carboxylate, alkylcarbonate, arylcarbonate and alkylsiloxide.

Suitable solvents for use in the composition of the present invention include organic solvents having a boiling point from about 150° C. to about 235° C., more preferably from about 170° C. to about 215° C. and include solvents such as glycols, alcohols, esters and ethers.

In a preferred embodiment, the composition of the present invention also includes a thixotropic material. In this embodiment, the composition in combination with solder powder functions as a solder paste.

The present invention also relates to a soldering process utilizing the solder composition of the present invention.

A more thorough disclosure of the present invention is presented in the detailed description which follows.

DETAILED DESCRIPTION OF THE INVENTION

The present invention relates to a solder flux composition comprising an organic quaternary ammonium salt and an organic solvent. The composition does not require cleaning after the soldering operation during the production of electronic devices such as printed circuit cards transistors, resistors, capacitors, chips and the like.

The organic quaternary ammonium salt in the solder flux composition of the present invention functions as the active ingredient to remove the oxide layer from the solder and to clean the metal surfaces to enable the formation of an effective solder joint. Suitable organic quaternary ammonium salts have the following formula:

$$R_1R_2R_3R_4N]^+X^-$$

$R_1$ to $R_4$ are each independently $C_1$-$C_{13}$ alkyl provided the total number of carbon atoms in $R_1$ to $R_4$ does not exceed 16 and $X^-$ is selected from oxide, hydroxide, alkoxide, aryloxide, carboxylate, monoalkylcarbonate, monoarylcarbonate and trialkylsiloxide. Preferably $R_1$ to $R_4$ are each independently $C_1$-$C_6$ alkyl.

Suitable alkoxides are $C_{1-10}$ alkoxides such as methoxide, ethoxide, isopropoxide and 2-hydroxyethoxide. Suitable aryloxides are phenoxides such as phenoxide, methylphenoxide, ethylphenoxide and isopropylphenoxide.

Suitable carboxylates are $C_{1-7}$ carboxylates such as formate, acetate, propionate, benzoate, and adipate.

Suitable alkyl carbonates are $C_{1-10}$ mono-alkylcarbonates such as methylcarbonate and ethylcarbonate. Suitable monoarylcarbonates are monophenylcarbonate and monoalkylphenylcarbonate e.g. monotoluylcarbonate. Suitable trialkyl siloxides are $C_{1-6}$ trialkylsiloxide such as trimethylsiloxide, triethylsiloxide, and t-butyl-dimethylsiloxide.

Suitable organic quaternary ammonium salts include tetramethylammonium hydroxide, tetramethylammonium methylcarbonate and tetramethylammonium acetate.

The R radicals and the organic $X^-$ radical can also comprise an alkenyl group and compositions with such radicals are contemplated as equivalents of the compounds claimed herein.

During the soldering operation, the organic quaternary ammonium salt decomposes and the decomposition products volatilize to obviate the need for cleanup. For example tetramethylammonium hydroxide decomposes to form trimethylamine and methanol which both volatilize during the soldering operation.

Suitable organic solvents for use in the composition of the present invention have a boiling point from about 150° C. to about 235° C. and more preferably from about 170° C. to about 215° C. Suitable solvents include glycols, ethers, alcohols and esters. Suitable solvents include lower alkyl glycols such as dipropylene glycol and propylene glycol; ethers such as dipropylene glycol monomethyl ether; esters such as butyl lactate; and alcohols such as isopropanol and butanol. Other suitable organic solvents for use in the composition of the present invention will be known to those skilled in the art.

In one embodiment of the present invention, the composition further comprises a thixotrope. Suitably, the thixotrope is a cellulose derivative or other high molecular weight polymer which exhibit shear thinning with stress. Suitable thixotropes are sold under the trade name of Methocel by Dow; Klucel by Aqualon; or Thixcin sold by NL Chemicals. The solder flux composition with the thixotrope can be mixed with solder powder to form a solder paste. Although the thixotrope generally does not volatilize during the soldering operation, it does not from a corrosive and/or conductive residue.

The solder flux composition of the present invention for wave solder and manual operations generally comprises about 10 to about 40% by weight of the organic quaternary ammonium salt and about 60 to about 90% by weight of the organic solvent. The solder flux composition of the present invention for use in solder paste generally comprises about 20 to about 40% by weight of the organic quaternary ammonium salt and about 3 to about 10% by weight of the thixotrope and about 50 to about 77% by weight of the organic solvent.

The solder flux composition of the present invention can be used with a wide range of different solder alloys, for example 63/37 and 60/40 Sn/Pb alloys; tin/lead/antimony solder alloys for example 60/39.7/0.3 and 63/36.7/0.3 Sn/Pb/Sb alloys, tin/lead/bismuth solder alloys, for example 43/43/14 Sn/Pb/Bi alloy, tin/bismuth solder alloy for example 42/58 Sn/Bi, or tin/lead/silver solder alloys for example 62/36/2 Sn/Pb/Ag alloy.

A typical solder paste formulation would comprise generally about 88 to 92% by weight of the solder alloy.

During the soldering operation using the composition of the present invention, the organic solvent volatilizes and the quaternary ammonium salt decomposes and volatilize rendering the soldered component substantially free from corrosive and conductive flux residues.

The present invention also relates to a process for soldering using the composition of the present invention. The process generally comprises the steps of (a) applying the solder flux composition and solder to the electronic device to be soldered, and (b) heating the flux composition and solder to solder said device and volatilize said composition.

The following examples are a detailed description of compositions of the present invention. The detailed description falls within the scope of, and serves to exemplify, the more generally described compositions set forth above. The examples are presented for illustrative purposes only, and are not intended as a restriction on the scope of the invention. All components are in weight %.

EXAMPLE 1 SOLDER FLUX COMPOSITIONS

| Composition | Components | Weight % |
| --- | --- | --- |
| A. | tetramethylammonium acetate | 14.6% |
|  | isopropanol | 85.4% |
| B. | tetramethylammonium acetate | 35.4% |
|  | ethylene glycol | 64.6% |
| C. | tetramethylammonium acetate | 26.2% |
|  | glycerine | 73.8% |
| D. | tetramethyl ammonium hydroxide .5 H$_2$O | 15.55% |
|  | isopropanol | 84.45% |
| E. | tetramethylammonium methyl carbonate | 10.8% |
|  | butyl lactate | 89.2% |
| F. | tetramethylammonium methyl carbonate | 16.25% |
|  | isopropanol | 83.75% |
| G. | tetramethylammonium hydroxide 5 H$_2$O | 94.0% |
|  | butanol | 6.0% |
| H. | tetramethylammonium hydroxide 5 H$_2$O. | 20.0% |
|  | butyl lactate | 80.0% |
| I. | tetramethylammonium hydroxide 5 H$_2$O. | 20.7% |
|  | ethylene glycol | 79.3% |
| J. | tetramethyl ammonium hydroxide 5 H$_2$O. | 10.85% |
|  | glycerine | 89.15% |

EXAMPLE II - SOLDER PASTE COMPOSITION

A solder flux composition for a solder paste was prepared with the following components:

| | |
| --- | --- |
| tetramethylammonium hydroxide: | 21% |
| Klucel | 3.95% |
| dipropyleneglycol. | 75.05% |

A solder paste was then formed with 10.25 weight% of the above composition and 89.75 weight% of the solder alloy (63/37 Sn/Pb alloy). After heating to reflow, the resulting residues from the flux composition were about 1.25%.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

I claim:

1. A solder flux composition which volatilizes during the soldering operation to leave substantially no flux residue, said composition comprising an organic solvent and an organic quaternary ammonium salt having the formula:

$$[R_1R_2R_3R_4N]^+X^-$$

where $R_1$ to $R_4$ are each independently $C_1$-$C_{13}$ alkyl provided the total number of carbons atoms in $R_1$ to $R_4$ does not exceed 16 and $X^-$ is selected from oxide, hydroxide, alkoxide, carboxylate, phenoxide, monoalkylcarbonate, monophenylcarbonate and trialkyl siloxide.

2. The composition of claim 1 wherein $X^-$ is selected from hydroxide, carboxylate and monoalkylcarbonate.

3. The composition of claim 1 wherein $R_1$ to $R_4$ are each independently $C_1$ to $C_6$ alkyl.

4. The composition of claim 1 wherein said composition further includes a thixotrope.

5. The composition of claim 4 wherein said composition further includes a solder powder.

6. The composition of claim 1 wherein said organic solvent is selected from glycol, ether, alcohol and ester.

7. A process for soldering an electronic device comprising the steps of:
   (a) applying solder and solder flux composition to the device, said composition comprising an organic solvent and an organic quaternary ammonium salt having the formula:

$[R_1R_2R_3R_4N]^+X^-$ where $R_1$ to $R_4$ are each independently $C_1$–$C_{13}$ alkyl provide the total number of carbon atoms in $R_1$ to $R_4$ does not exceed 16 and $X^-$ is selected from oxide, hydroxide, alkoxide, phenoxide, carboxylate monoalkylcarbonate, monophenylcarbonate and trialkyl siloxide; and
   (b) heating the solder and solder flux composition to solder the device and volatilize substantially all of said composition.

8. The process of claim 7 wherein $X^-$ is selected from hydroxide, carboxylate and monoalkylcarbonate.

9. The process of claim 7 wherein $R_1$ to $R_4$ are each independently $C_1$ to $C_6$ alkyl.

10. The process of claim 7 wherein said composition further includes a thixotrope.

11. The process of claim 10 wherein said composition further includes a solder powder.

12. The process of claim 7 wherein said organic solvent is selected from glycol, ether, alcohol and ester.

13. The composition of claim 6 wherein said organic solvent has a boiling point of from about 150° C. to about 235° C.

14. The process of claim 12 wherein said organic solvent has a boiling point of from about 150° C. to about 235° C.

* * * * *